United States Patent [19]

Edwards

[11] Patent Number: 4,906,040
[45] Date of Patent: Mar. 6, 1990

[54] TRUCK BED LINER AND RETAINER CLIP

[76] Inventor: Russell Edwards, 625 Atlanta Dr., Hermitage, Tenn. 37076

[21] Appl. No.: 173,646

[22] Filed: Mar. 25, 1988

[51] Int. Cl.$^4$ .......................... B62D 33/02; F16B 6/06
[52] U.S. Cl. .................... 296/39.2; 224/42.42; 52/509; 24/297; 24/573
[58] Field of Search .................. 296/39 R; 224/42.42; 52/509, 511; 24/573, 458, 295, 297

[56] References Cited

U.S. PATENT DOCUMENTS

| | | | |
|---|---|---|---|
| 2,200,047 | 5/1940 | Tinnerman | 24/458 X |
| 2,208,727 | 7/1940 | Marshall | 24/458 |
| 2,664,213 | 7/1953 | Bedford, Jr. | 24/295 |
| 2,820,533 | 1/1958 | Mount | 24/573 X |
| 3,292,479 | 12/1966 | Tinnerman et al. | 24/573 |
| 4,659,133 | 4/1987 | Gower | 296/39 R |
| 4,740,026 | 4/1988 | Wagner | 296/39 R |
| 4,745,666 | 5/1988 | Murphy | 24/295 X |

Primary Examiner—Dennis H. Pedder
Attorney, Agent, or Firm—Mark J. Patterson

[57] ABSTRACT

A truck bed liner has a plurality of slot pairs spaced around the top of the vertical walls of the liner at a level just below the interior flange of the truck bed walls. Resilient retainer clips engage the flange of the truck bed walls and secure the liner to the bed through the slot pairs.

5 Claims, 2 Drawing Sheets

TRUCK BED LINER AND RETAINER CLIP

BACKGROUND OF THE INVENTION

The present invention relates to a combination of a truck bed liner and clip for retaining and securing the liner to the bed and cargo area of pickup trucks and the like. More specifically, the present invention relates to a combination of liner and clip which allows the liner to be secured in a truck bed without the use of screws, rivets, or similar fasteners.

The use of durable protective liners in pickup truck beds has become quite popular, and a number of such liners have been marketed. A problem common to the use of all such liners is how to best secure the liner to the bed. These liners are typically made of a durable plastic such as ultra-high molecular weight polyethylene, known for its strength and resistance to deformation. It has been recognized from the beginning that the usual means of securing the liner to the bed, using screws, rivets, toggle bolts, or the like, was less than satisfactory for several reasons. Many truck owners object to drilling multiple holes into their truck bed for aesthetic reasons and because of possible corrosion problems. Another well-known problem is that variations in ambient temperature causes movement of the plastic liner, as much as 0.001 inch per one degree Fahrenheit change. When the liner is firmly secured by screws, for example, temperature expansion of the liner can produce undesirable warping.

A number of attempts have been made to solve these problems, by using various liner retainers that do not require the use of fasteners that penetrate the truck bed or body. Examples are disclosed in U.S. Pat. Nos. 4,540,214; 4,572,568; 4,575,146; and 4,659,133. However, each of these prior art retaining means employs screw fastener type devices. Consequently, optimum flexibility of the liner is not attained, and installation or removal of the liner for cleaning or maintenance is inconvenient.

What is needed, then, is a truck bed liner that can be installed and removed quickly and without the use of screws, rivets or bolts, and which can flex under temperature changes without excessive warping.

SUMMARY OF THE INVENTION

In the present invention, a truck bed liner is designed such that it can be quickly installed and removed without the use of screws, rivets, clamps, or bolts. The liner is of a generally conventional construction, comprising a one-piece covering for the horizontal floor and side walls of a pickup truck bed. A generally horizontal flange with a curved lip fits over and partially around the top surface of the truck bed side wall. Most side walls of modern pickup truck beds have a flange extending vertically downward from the top horizontal surface of the wall. Pairs of slots are provided in the liner at a level slightly below the interior flange of each side wall. A corresponding number of flexible clips specifically adapted to snap through these slots are provided. After the liner is positioned within the bed, the clips are inserted, engaging without penetrating the interior flange of the truck bed side wall, thereby securing the liner to the bed without the use of fasteners or tools. Also, because the liner is secured by tension applied only along the periphery of its vertical walls, the majority of the plastic liner is free to expand and contract unconstrained by more conventional fastener means which produce undesirable warped areas. The liner is removed simply by reversing the process.

An object of the present invention, then, is to provide a truck bed liner that can be installed quickly and easily without the need for tools.

Another object of the invention is to provide a means for securing a truck bed liner that does not use screws or other fasteners that can damage the truck bed.

A further object of the present invention is to provide a means for securing a truck bed liner that minimizes warpage of the liner under temperature variations.

DESCRIPTION OF THE PREFERRED EMBODIMENT

Figure 5:
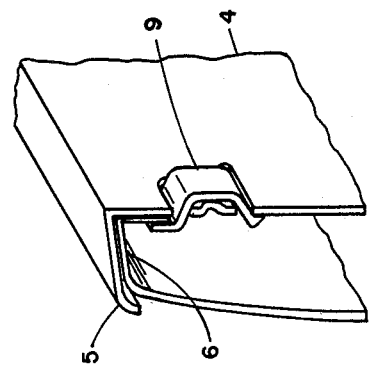
FIG. 5 is a perspective view of an assembled clip with wall and liner sections.

In the present invention, as seen on FIG. 5, truck bed liner 1 comprises a single piece of plastic or similar resilient and durable material, such as ultra-high molecular weight polyethylene, molded or formed to conform to the shape and size of the bed of a pickup truck 2, having a horizontal floor 3 and generally vertical walls 4.

As best seen in FIGS. 2 through 5, an approximate 90 degree bend is formed in liner wall 4, allowing wall 4 to extend over and, at lip 5, partially around the top surface 6 of the truck bed wall. An interior flange 7 extends vertically downward from truck bed wall top surface 6. Located immediately below flange 7 are pairs of slots 8, approximately three inches wide and spaced approximately two inches apart, although their dimensions are not critical. There are a plurality of paired slots 8 spaced around the flange of the vertical walls of the truck bed.

Figure 1:
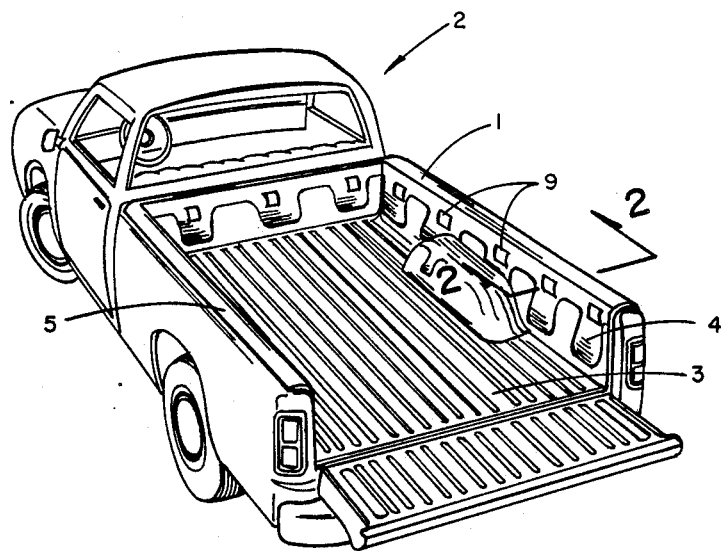
FIG. 1 is a perspective view of the entire truck bed liner installed in the bed of a pickup truck.
Figure 2:
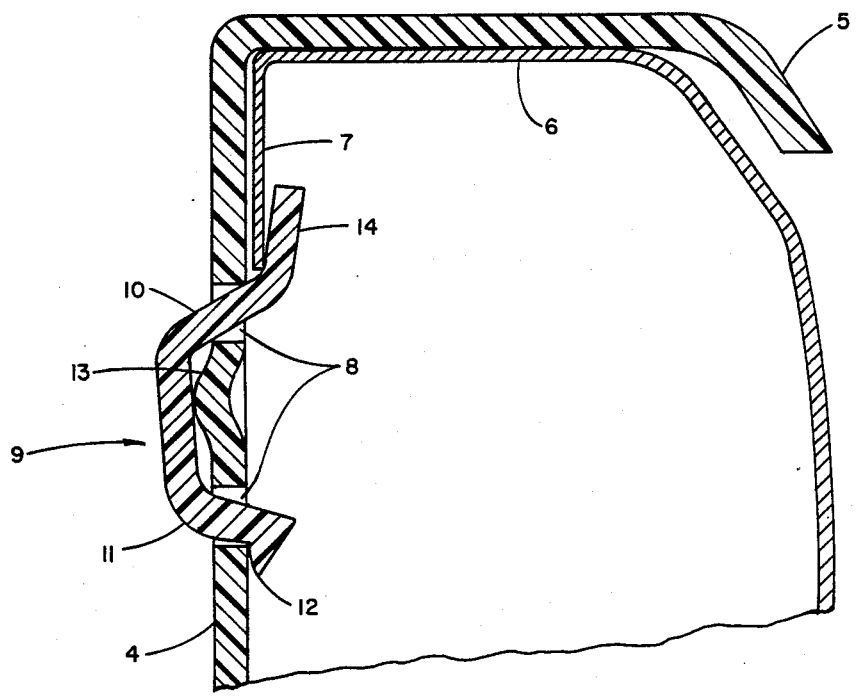
FIG. 2 is a side view of the liner clip securing a section of the liner to a section of a vertical wall of a truck bed.
Figure 3:
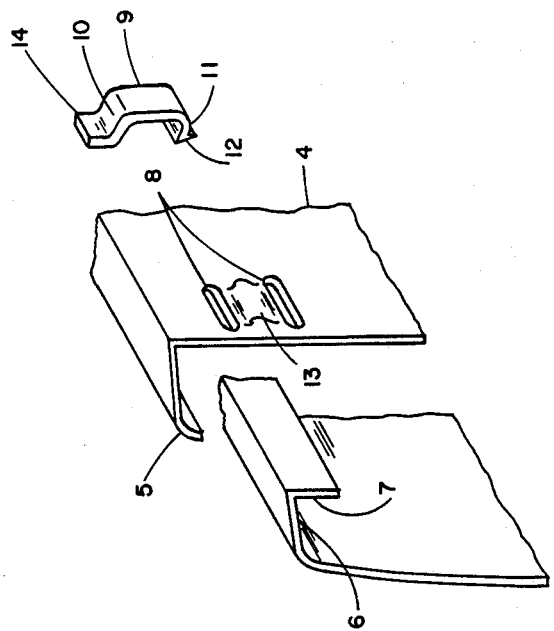
FIG. 3 is an exploded perspective view of the liner clip, a section of the truck bed wall, and a section of the liner wall showing a pair of slots.
Figure 4:
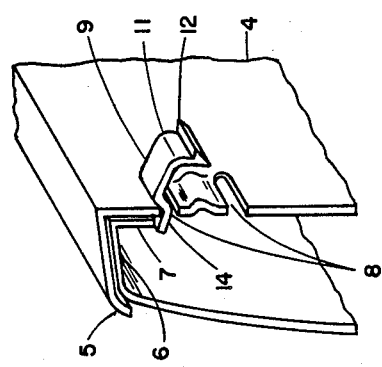
FIG. 4 is a perspective view of a clip, partial truck bed wall, and partial liner wall, as the clip is being installed.

A retainer clip 9, made of plastic or other resilient material, is adapted to press fit into each pair of slots 8 so as to simultaneously engage and secure liner wall 4 to truck bed flange 7. To accomplish this while making clip 9 easy to install, clip 9 is shaped as best seen on FIGS. 2 and 3. The upper end 10 of clip 9 is curved slightly less than ninety degrees and is inserted into the topmost of slot pair 8 as shown in FIG. 3. Lip section 14 of clip 9 engages the inner wall of flange 7. Lower end 11 of clip 9 is then rotated down and through the lower of slot pair 8. Slight manual compression of clip 9 is desirable in order to accomplish this. Depending on the flexibility of the material chosen, a simple flat tool with a chisel point may assist in installing the clips. Barb 12 then engages the opposite vertical surface of liner wall 4. So installed, clip 9 is under tension, forcing liner wall 4 against truck bed flange 7. Ridge 13 on wall 4 minimizes horizontal movement of clip 9, and truck bed wall top surface 6 minimizes vertical movement. Clip 9 can easily be removed by simply manually compressing it and rotating it out of slot pair 8 or by grasping the top of wall 4 and pushing, causing clip 9 to pop out. It is recognized that variations in the shape of said clip 9 can be used without departing from its essential purpose and function, and the scope of the claimed invention is not confined solely to the shape described in the drawings. For example, a notch can be added within barb 12 to increase its flexibility for ease of installation.

What I claim is:

1. In conjunction with a truck bed having a horizontal bed floor and opposing side walls, where the interior of each of said truck bed side walls includes a flange extending vertically downward from a top surface of said side wall, a truck bed liner and retainer clip combination comprising:
    (a) a liner having a horizontal floor and vertical side walls generally conforming to the shape of said truck bed, said liner further comprising a plurality of pairs of slots through each of said vertical side walls immediately below the corresponding truck bed side wall interior flange; and;
    (b) plural one-piece resilient retainer clip means, each of said clip means adapted for press fit insertion into an upper slot and a lower slot of each of said slot pairs, thereby securing said vertical walls of said liner to said corresponding truck bed side wall interior flange.

2. The combination of claim 1 wherein said liner extends over and engages the top surface of the opposing side walls of said truck bed.

3. In conjunction with a truck bed liner having a horizontal bed floor and opposing side walls, where the interior of each of said truck bed side walls includes a flange extending vertically downward from the top of each of said side walls, a truck bed liner and retainer clip combination comprising:
    (a) a liner having a horizontal floor and vertical side walls generally conforming to the shape of said truck bed, said liner further comprising a plurality of pairs of slots through each of said vertical side walls immediately below the corresponding truck bed side wall interior flange;
    (b) plural one-piece resilient retainer clip means, each of said clip means adapted for press fit insertion into an upper slot and a lower slot of said slot pairs, thereby securing said vertical walls of said liner to said corresponding truck bed side wall interior flange;
    (c) said liner extends over and engages the top surface of the opposing side walls of said truck bed; and
    (d) a ridge integral to said liner vertical walls and extending inward from between said upper and said lower slot of each of said slot pairs to restrict horizontal movement of said retainer clip means.

4. The invention of either of claims 1, 2, or 3 where said retainer clip means comprises a curved lip section for engaging said flange and said liner vertical wall through said upper slot of each of said slot pairs and a barb section for engaging said vertical liner wall through said lower slot of each of said slot pairs.

5. In conjunction with a truck bed having a horizontal bed floor and opposing side walls, where the interior of each of said side walls includes a flange extending vertically downward from said side wall top surface, a truck bed liner and retainer clip combination comprising:
    (a) a liner having a horizontal floor and vertical side walls generally conforming to the shape of said truck bed, said liner further comprising a plurality of pairs of slots through said liner vertical walls and immediately below said corresponding truck bed side wall interior flange; and
    (b) a plurality of retainer clip means, each adapted for press fit insertion into each of said slot pairs, each of said clip means comprising a unitary, resilient clip having upper and lower ends curved toward and through corresponding upper and lower slots of said slot pairs, a lip section curving upward from said clip upper end for engaging the outer facing surface of said truck bed side wall interior flange above said upper slot, and a barb section proximate to said clip lower end for engaging the outer facing surface of said corresponding liner vertical wall below said lower slot.

* * * * *